Dec. 9, 1947.   A. G. H. CARLBOM   2,432,467
VARIABLE LOAD BRAKE
Filed April 30, 1946   3 Sheets-Sheet 1
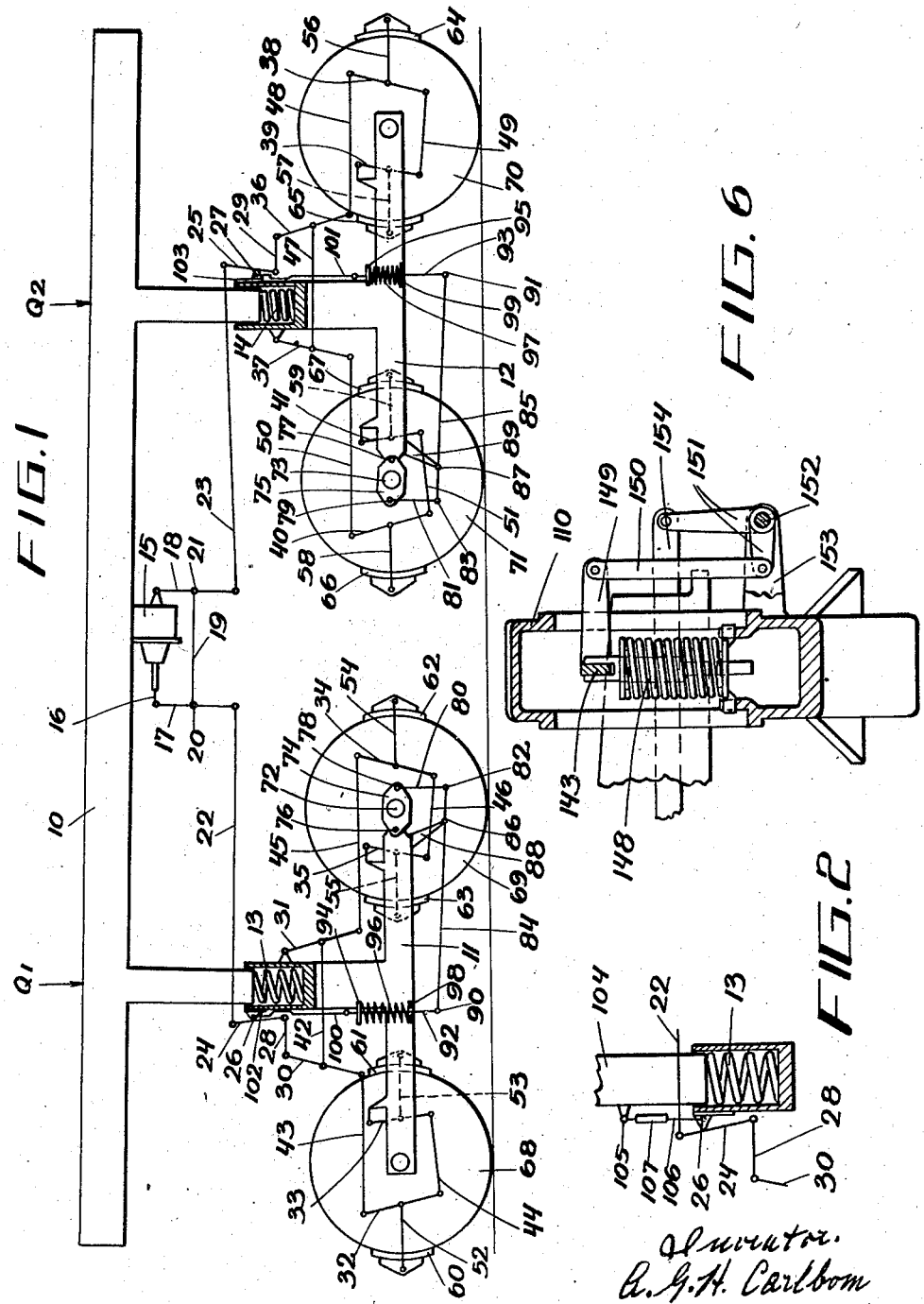

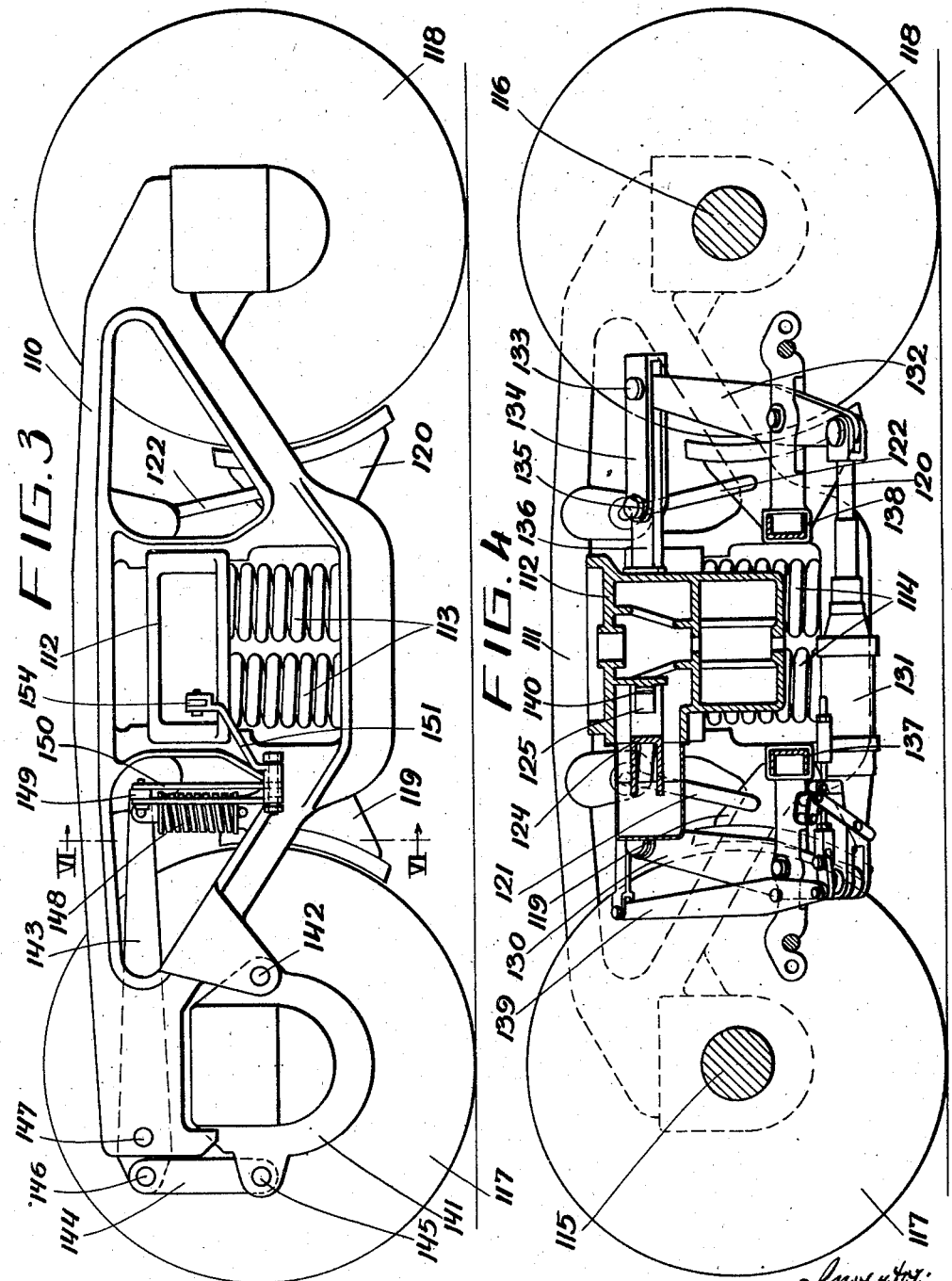

Patented Dec. 9, 1947

2,432,467

UNITED STATES PATENT OFFICE 2,432,467

VARIABLE LOAD BRAKE

Axel Georg Hjalmar Carlbom, Malmo, Sweden, assignor to Svenska Aktiebolaget Bromsregulator, Malmo, Sweden, a corporation of Sweden Application April 30, 1946, Serial No. 666,070

3 Claims. (Cl. 188—195)

This invention relates to air brakes for railway cars and more particularly to variable load brakes for railway cars of the type comprising a car body and two wheeled swivelling bogies or trucks carrying and guiding the two ends of the car body. Hereinafter cars of this type will be called bogie cars as distinct from cars with two wheel axles.

Variable load brakes for railway cars are known in which the brake applying leverage of the brake rigging for transmitting the brake power from the brake cylinder to the brake shoes is varied automatically according to the load of the car by means of a load-controlled variable leverage gear forming part of the brake rigging. Suitable constructions of load-controlled variable leverage gears for such variable load brakes are disclosed in the U. S. Patents Nos. 2,204,925 and 2,384,257 and in the U. S. patent applications to Bert Henry Browall, Ser. No. 488,217, filed May 24, 1943, and Ser. No. 619,649, filed October 1, 1945. These known variable load brakes of the variable leverage type have been found very satisfactory as far as cars with two axles are concerned, but for several reasons they have been found less satisfactory for bogie cars. Some of said several reasons may be explained as follows. The preferred form of the variable leverage gear comprises a so-called reversing lever and a shiftable fulcrum therefor, and the preferred form of the load-control for this variable leverage gear comprises a special spring balancing part of the weight of the car and the variable load thereon, and mechanism for transmitting movements depending on the yielding of said spring to said shiftable fulcrum for adjusting the position thereof. In a bogie car said spring must be mounted on the bogie or truck, and because of the swivelling and vertical movements of the bogie or truck in relation to the car body carried thereon, it is hardly possible to construct suitable mechanism for transmitting the yielding movements of the balancing spring on the bogie or truck to the shiftable fulcrum of the variable leverage gear when mounted on the car body as hitherto proposed. But even if this constructional problem could be solved satisfactorily, there still remains the problem arising from non-uniform distribution of the weight of, or load on, the car between the two ends thereof. In cars with two axles the risk of overbraking (sliding) the wheels at the less loaded end of the car may advantageously be avoided by such a construction of the load-control for the variable leverage gear as to make the brake applying leverage dependent on the weight reposing on the wheels at the end of the car occasionally carrying the smaller portion of the load, for instance as disclosed in the U. S. Patent No. 2,195,508, but this construction is hardly applicable to, and also not desirable in, bogie cars. It would result in too poor a utilization of the retarding capacity of the wheels of the bogie or truck at the heavier loaded end of the car. As a rule, a bogie car is much longer than a car with two axles and, therefore, the difference in load on the two bogies or trucks of a bogie car may be much greater than the difference in load on the two axles of a car with two axles. Because of this, which is true especially in respect of freight cars, it has already been proposed to provide bogie cars with load brakes with separate load-control of the braking effort at each of the two bogies or trucks, for instance as disclosed in the U. S. Patent No. 843,481. But these already proposed variable load brakes for bogie cars are of a type radically different from the variable leverage type. They are based on the use of a separate brake equipment comprising a brak cylinder, an auxiliary air reservoir, a triple valve, and a load-controlled pressure regulating valve on each of the two bogies or trucks. Further, the brake rigging for transmitting the brake power from the brake cylinder to the brake shoes must be of a different design for each different car or bogie or truck requiring a different braking effort.

One object of the present invention is to provide a simple and satisfactory variable load brake of the load-controlled variable leverage type for bogie cars.

Another object of the invention is to provide a variable load brake of the load-controlled variable leverage type for bogie cars, in which a single brake cylinder may be used for the two bogies or trucks at the two ends of the car, and in which, nevertheless, the load-control of the brake applying leverage is separate for each of the two bogies or trucks.

Still another object of the invention is to provide a variable load brake of the load-controlled variable leverage type for bogie cars, in which the load-control of the brake applying leverage is separate for each of the two bogies or trucks at the two ends of the car, and in which, nevertheless, a single brake cylinder may be used for the two bogies or trucks at the two ends of the car, and the brake rigging for transmitting the brake power from the brake cylinder to the brake shoes at the two ends of the car may be of the same design for cars or bogies or trucks requiring relatively different braking efforts.

For these and other objects which will be apparent from the following description taken in connection with the accompanying drawings, the invention consists in the combination, organization and construction of parts hereinafter described and illustrated by way of examples in the drawings and finally pointed out in the appendant claims.

In the drawings:

Fig. 1 is a diagrammatic side view, partly in section, of a bogie car equipped with a variable load brake of the load-controlled variable leverage type according to the invention.

Fig. 2 is a diagrammatic detail side view, partly in section, illustrating a modification.

Fig. 3 is a side view of a truck embodying a modified constructional form of the variable leverage gear and the load-control therefor, forming part of the invention.

Fig. 4 is a vertical longitudinal section of the truck shown in Fig. 3, and

Fig. 5 is a plan view, partly in section, thereof, drawn on a reduced scale, whereas Fig. 6 is a section drawn on a larger scale and taken substantially on the line VI—VI in Fig. 3.

Figure 5:
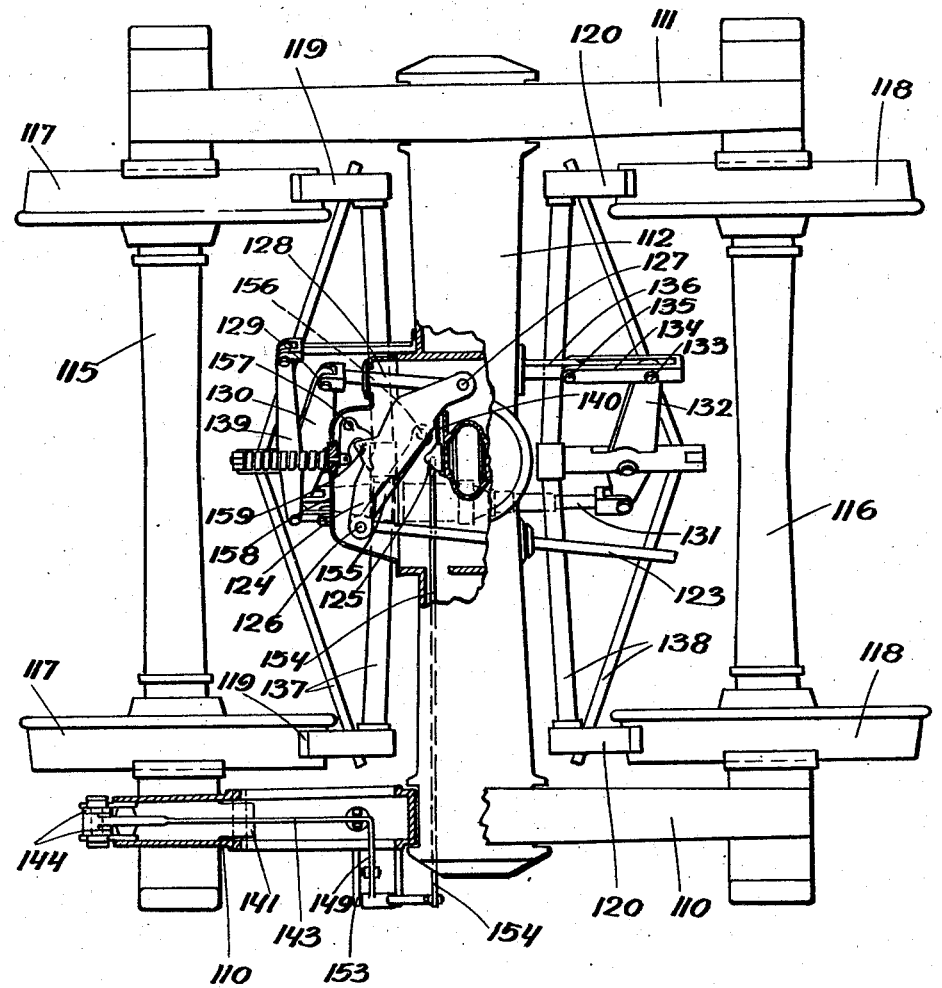

Referring first to Fig. 1, 10 denotes a car body carried and guided by two bogies or trucks 11 and 12 having supporting springs 13 and 14, respectively, for the car body. A brake cylinder 15 is mounted on the under side of the car body 10, and the push rod 16 of the brake cylinder acts upon one of a couple of equalizing brake levers 17 and 18 connected to each other by a connecting rod 19 at points 20 and 21, respectively, disposed between the ends of the levers. By the equalizing brake levers 17 and 18, and main brake pull rods 22 and 23 connected thereto, the brake power of the brake cylinder 15 is distributed equally to the two bogies or trucks. In each of the two bogies or trucks the brake power transmitted thereto is converted by a separate variable leverage gear into a brake applying leverage adjusted to suit that part Q1 or Q2 of the weight of the car body and the load thereon occasionally reposing on the respective bogie or truck. The variable leverage gear on each of the two bogies or trucks 11 and 12 comprises a variable leverage lever 24 or 25, respectively, and a shiftable fulcrum 26 or 27, respectively, for this lever which has one end connected to the main pull rod 22 or 23, respectively. From the other end of each of the two variable leverage levers 24 and 25 the brake power is transmitted by means of thrust rods 28 and 29, respectively, brake levers 30, 31, 32, 33, 34, 35 and 36, 37, 38, 39, 40, 41, respectively, pull rods 42, 43, 44, 45, 46 and 47, 48, 49, 50, 51, respectively, and brake beams 52, 53, 54, 55 and 56, 57, 58, 59, respectively, to the brake shoes 60, 61, 62, 63 and 64, 65, 66, 67, respectively, which coact with the wheels 68, 69 and 70, 71, respectively.

At a braking operation, the power of the brake cylinder 15 will create equal forces in the two main brake pull rods 22 and 23 and, nevertheless, the brake pressure of the brake shoes against the wheels at each of the bogies or trucks will be determined independently of the brake pressure of the brake shoes against the wheels at the other bogie or truck, and automatically according to the weight of the car body and the load thereon reposing on the bogie or truck. Obviously the brake applying leverage at each of the two bogies or trucks will be determined by the position of the shiftable fulcrum 26 or 27, and each of the bogies or trucks is provided with mechanism for automatically adjusting the position of the shiftable fulcrum 26 or 27 according to the weight of the car body and the load thereon reposing on the bogie or truck. In the form diagrammatically illustrated in Fig. 1 said mechanism is as follows. In each of the bogies or trucks 11 and 12 one of the wheel axles, namely the axle 72 of the wheel pair 69 in the truck 11, and the axle 73 of the wheel pair 71 in the truck 12, are mounted in journal boxes 74, 75, respectively, pivoted to the frame of the truck by means of pins 76, 77, respectively, disposed substantially on the level of the wheel axles and inside of them. Outside of the wheel axles these journal boxes 74, 75 are connected by means of bolts 78, 79, respectively, to links 80, 81, respectively, which in turn are connected by means of bolts 82, 83, respectively, to the one ends of balancing levers 84, 85, respectively. The balancing levers 84, 85 are fulcrumed at 86, 87, respectively, to brackets 88, 89, respectively, depending from the frames of the trucks 11, 12, respectively, and the other ends of the balancing levers 84, 85 are connected by means of bolts 90, 91, respectively, and links 92, 93, respectively, to movable spring thrust plates 94, 95, respectively, reposing on balancing springs 96, 97, respectively, which in turn repose on the frames of the trucks 11, 12, respectively, as shown at 98, 99, respectively. Obviously, the heavier the load on the truck 11 or 12, is, the greater is the pulling force in the link 80 or 81, respectively, and the more will the spring 96 or 97, respectively, be compressed. In other words, each of the plates 94 and 95 will change its position vertically in relation to the frame of the truck 11 or 12, respectively, with the load reposing on the truck. For adjusting the positions of the shiftable fulcrums 26 and 27 independently of each other and automatically according to changes in the positions of the plates 94 and 95, respectively, the shiftable fulcrums 26 and 27 are connected to the plates 94 and 95 by means of links 100 and 101, respectively. In the showing of Fig. 1 the two trucks 11 and 12 are unequally loaded, the truck 11 being less loaded than the truck 12. Consequently, the shiftable fulcrum 26 in the truck 11 is shown in a position near the upper end of its guide 102, so that the lever 24 will convert the force in the main brake pull rod 22 into a relatively small brake applying leverage acting on the brake shoes 60—63 of the truck 11, whereas the shiftable fulcrum 27 in the truck 12 is shown in a position near the lower end of its guide 103, so that the lever 25 will convert the force in the main brake pull rod 23 into a relatively great brake applying leverage acting on the brake shoes 64—66 of the truck 12.

While it is preferable to provide special springs, such as the springs 96 and 97, balancing parts of the loads on the trucks, for the purpose of adjusting the shiftable fulcrums 26 and 27, it may be possible to make provision for utilizing the yielding movements of the supporting springs 13 and 14 for the two ends of the car body for the adjustment of the shiftable fulcrums 26 and 27. Fig. 2 diagrammatically illustrates such a modification as regards the truck 11. A part 104 of the car body 10 reposing on the supporting spring 13 has a bracket 105 to which the shiftable fulcrum 26 is connected by means of a link 106, so that in this modification the position of the shiftable fulcrum 26 will depend on the degree of the compression of the supporting spring 13 under the variable load reposing thereon. In order to permit the supporting spring 13 to yield to changes in the load thereon even when, during a braking operation, the shiftable fulcrum 26 is blocked against movement, a yielding element 107 may be connected in the link 106. The reason why this modification is not preferred, though it may appear very simple, is that it makes the adjustment of the shiftable fulcrums dependent on the qualities of the supporting springs of the trucks. In practice, these springs must be exchangeable and will be exchanged or renewed oftentimes, and they may vary considerably as to their stiffness and other qualities, for instance due to the use together with them of different shock absorbers and friction dampers, etc. Further, settings of the supporting springs also would effect the adjustment of the shiftable fulcrums, whereas the special springs 96 and 97 balancing only parts of the loads on the trucks may be made specially for their purpose and may be calibrated to equal stiffness and loaded so slightly that they will not set during use.

The truck shown in Figs. 3 to 6 is of the type comprising two side frames 110 and 111 and a bolster 112 extending transversely between the side frames in which the ends of the bolster are guided and repose on supporting springs 113 and 114, respectively. Journaled in journal boxes on the side frames are two wheel axles 115 and 116 having pairs of wheels 117 and 118, respectively. Brake shoes 119 and 120 for coaction with the wheels 117 and 118, respectively, are provided only inside of the wheel axles. The brake shoes 119, 120 are suspended by hangers 121, 122, respectively. For transmitting the brake power to the truck there is a main brake pull rod 123 (Fig. 5) which corresponds to one of the two main brake pull rods 22, 23 in Fig. 1 to which reference may be had in this connection, in that the truck and the brake equipment thereon shown in Figs. 3-6 may be considered as a modified constructional form of one of the trucks 11 and 12 and the brake equipment thereon diagrammatically illustrated in Fig. 1. Housed in the bolster 112 is a variable leverage gear comprising a lever 124 and a shiftable fulcrum 125 therefor (Fig. 5). The lever 124 has one end connected to the brake pull rod 123 by means of a bolt 126. Connected to the other end of the lever 124 by means of a bolt 127 is a push rod 128 having a projecting end connected by means of a bolt 129 to one end of a live brake lever 130 which has its other end connected by means of a brake thrust rod 131 to one end of a dead brake lever 132 whose other end is fulcrumed at 133 to a link 134 pivoted at 135 to a bracket 136 on the bolster 112. Pivoted to the brake levers 130 and 132 between their ends are brake beams 137 and 138, respectively, on which the brake shoes 119 and 120, respectively, are mounted. Preferably, and as shown, the brake thrust rod 131 is in the form of an automatic brake slack adjuster of the type disclosed in my U. S. patent application Ser. No. 632,720, filed December 4, 1945, the operating lever for this slack adjuster being shown in Figs. 4 and 5 and given the reference numeral 139.

Obviously, when braking, the brake applying leverage by which the brake shoes will be pressed against the wheels, will be determined by the position of the shiftable fulcrum 125 along its guide 140. The illustrated mechanism for load-controlling this position is as follows: The journal box 141 for the wheel axle 115 at the side frame 110 of the truck is pivoted to this side frame 110 by means of a bolt 142 inside of the wheel axle 115, as is best shown in Fig. 3, so that the journal box 141 is movable vertically in relation to the side frame 110 about the bolt 142. Outside of the wheel axle 115 the movable journal box 141 is linked to one end of a balancing lever 143 by means of a link 144 connected to the journal box 141 and to the lever 143 by means of bolts 145 and 146, respectively. The balancing lever 143 is disposed above the wheel axle 115 and within the frame 110 and extends longitudinally thereof and is fulcrumed thereto by means of a bolt 147 (Fig. 3) at a short distance from the outer end to which the journal box 141 is linked by means of the link 144. At its inner end the balancing lever 143 is supported from the frame 110 by means of a coiled compression spring 148 balancing that part of the load on the truck which acts as a thrust force on the link 144 connected to the outer end of the lever 143. Obviously, the degree of the compression of the spring 148 by the lever 143, and thus the position of the latter in the vertical direction, will change with the load on the truck from the end of the car body which is to be carried and guided on the bolster of the swivelling truck in the usual manner. The movements of the inner end of the lever 143 are transmitted to the shiftable fulcrum 125 for adjusting it along its guide 140. For this purpose the lever 143 is provided at its inner end with a lateral extension 149 projecting to the outside of the side frame 110, the projecting outer end of the extension 149 being connected by means of a link 150 (Fig. 6) to one arm of a bell crank lever 151 which is pivoted at 152 to a bracket 153 on the side frame 110 and has its other arm connected to the shiftable fulcrum 125 by means of an adjusting rod 154 disposed within the bolster 112 longitudinally thereof, as is best shown in Fig. 5.

It is important to note in connection with this invention that it eliminates the necessity of making changes in the construction or design or mounting of the several parts of the brake equipments on the car body and on the trucks for suiting such equipments to requisite different braking efforts. The import of this is that the several parts of the brake equipments for different cars, requiring rather widely different braking efforts, may be of exactly the same construction, design and mounting. Thus it will not be necessary to make any change in the leverage ratio of the equalizing levers 17 and 18 on the car body or in the leverage ratio of the equalizing levers 30, 31 or 36, 37 (Fig. 1) or 130, 132 (Fig. 5), or of any possible following brake levers such as the levers 32, 33, 34, 35 or 38, 39, 40, 41 (Fig. 1) on the trucks, for instance when shifting a truck from one car to another of a different load capacity requiring a different braking effort. This fact simplifies the exchange of trucks between the cars and also the keeping of spare parts for repairs. A truck may be shifted from one car to another of even a rather widely different load capacity without further ado as far as the brake equipments on both the car and the truck are concerned, because the load-controlled variable leverage gear on the truck will automatically and independently adjust the braking effort on the truck to suit the load thereon.

For the sake of completeness it may be added that, as disclosed in the U. S. Patent No. 2,204,925 and for purposes therein explained, the lever 124 of the variable leverage gear may be guided in its movements by an arm 155 which is pivoted at 156 to the housing for the variable leverage gear formed in the bolster 112, and which has its free end connected to the lever 124 by the bolt 126, and further by a curved guiding member 157 which is resiliently mounted for instance on a removable cover 158 closing an opening in the aforesaid housing, and with which a roller 159 or the like on the lever 124 coacts.

What I claim and desire to secure by Letters Patent is:

1. In a railway car comprising a car body and two swivelling trucks carrying and guiding the two ends of the car body and each comprising a frame, two wheel axles, and journals for the wheel axles on the frame, a variable load brake comprising, in combination, a brake equipment on each of the two trucks, comprising a variable leverage gear comprising a brake lever and a shiftable fulcrum therefor, a brake cylinder common to the brake equipments on the two trucks and mounted on the car body between the ends thereof, means comprising a couple of interconnected equalizing brake levers associated with the brake cylinder, and main brake pull rods extending from the two equalizing brake levers associated with the brake cylinder to the two trucks, for distributing the brake power of the common brake cylinder equally to the levers of the variable leverage gears on the two trucks, and means on each of the two trucks for independently adjusting the shiftable fulcrum of the variable leverage gear on the truck automatically according to that part of the weight of the car body and the load thereon reposing on the wheel axles of the truck, said last mentioned means comprising means to permit vertical movement of one of the wheel axles in relation to the frame of the truck, means comprising a lever fulcrumed to the frame of the truck and operatively connected to the vertically movable wheel axle, and a spring supporting this lever from the frame of the truck, for balancing part of the weight of the truck and the load thereon reposing on the vertically movable wheel axle, and means for transmitting movements depending on the yielding of said spring to the shiftable fulcrum for the adjustment thereof.

2. In a railway car with a variable load brake as claimed in claim 1, the additional feature that one of the journals for the vertically movable wheel axle of each of the two trucks forms part of the means permitting the vertical movement of this axle and is pivoted to the frame of the truck substantially at the level of the wheel axle at one side thereof and is connected at the other side of the wheel axle to the lever of the means for balancing part of the weight of the truck and the load thereon reposing on the vertically movable wheel axle.

3. In a railway car with a variable load brake as claimed in claim 1, the additional features that one of the journals of the vertically movable wheel axles of each of the two trucks forms part of the means permitting the vertical movement of this axle and is pivoted to the frame of the truck inside of the wheel axle and substantially at the level thereof and is connected outside of the wheel axle to one end of the lever of the means for balancing part of the weight of the truck and the load thereon reposing on the vertically movable wheel axle, that this lever is disposed longitudinally of the frame of the truck and is fulcrumed a short distance from said end thereof to said frame and supported from said frame by the balancing spring at its other end, and that the means for transmitting movements depending on the yielding of said spring to the shiftable fulcrum comprises a bell crank lever pivoted to the frame of the truck, and link rods connecting the arms of the bell crank lever to the balancing lever and to the shiftable fulcrum, respectively.

AXEL GEORG HJALMAR CARLBOM.

REFERENCES CITED

The following references are of record in the file of this patent:

UNITED STATES PATENTS

| Number | Name | Date |
|---|---|---|
| 468,618 | Hinckley | Feb. 9, 1892 |